United States Patent [19]

Cognard et al.

[11] 4,376,715
[45] Mar. 15, 1983

[54] COMPOSITION BASED ON LIQUID CRYSTAL FOR ELECTRO-OPTICAL DEVICE

[75] Inventors: Jacques Cognard, Chezard; Trung H. Phan, Neuchatel, both of Switzerland

[73] Assignee: Ebauches S.A., Neuchatel, Switzerland

[21] Appl. No.: 172,641

[22] Filed: Jul. 25, 1980

[30] Foreign Application Priority Data

Aug. 17, 1979 [CH] Switzerland .................. 7543/79

[51] Int. Cl.³ .................. C09K 3/00; C07C 49/68
[52] U.S. Cl. .................. 252/301.16; 252/301.17; 260/351; 260/369; 260/378; 260/380; 260/383
[58] Field of Search .................. 252/301.16, 301.17; 260/365, 351, 380

[56] References Cited

U.S. PATENT DOCUMENTS 3,549,667 12/1970 Wunderlich et al. .................. 260/380
3,792,970 2/1974 Neeff .................. 260/380 X
4,014,906 3/1977 Karlen et al. .................. 260/373
4,111,966 9/1978 Hindermann et al. .................. 260/373
4,210,413 7/1980 Gehrke et al. .................. 260/380 X

*Primary Examiner*—F. Edmundson
*Attorney, Agent, or Firm*—Young & Thompson

[57] ABSTRACT

A composition for use in an electro-optical device, particularly a display device, contains anthraquinone pleochroic dye of formula (I):

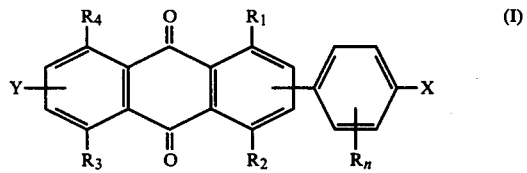

(I)

where $R_1$ is a substituted or unsubstituted amino group or a hydroxy group; each of $R_2$, $R_3$ and $R_4$, which are identical or different, is a hydrogen atom, a substituted or unsubstituted amino group, a hydroxy group or a nitro group; R is a hydrogen or halogen atom or a hydroxy, lower alkyl or lower alkoxy group; n is 1, 2, 3 or 4, the Rs being identical or different when n is 2, 3 or 4; X is a hydrogen or halogen atom, a hydroxy or mercapto group, a straight, branched or cyclic $C_{1-16}$ alkyl radical, a substituted or unsubstituted aryl group or a group of formula OR', OAr, SR', SAr, COOR', COOAr, COO—$C_6H_4$—R', OOCR', OOCAr, OOC—$C_6H_4$—R', CONHR', CONHAr, NHR', NHAr, NHCOR', NHCOAr, OCOOR', OCOOAr, CH=N—$C_6H_4$—R', N=CH—$C_6H_4$—R', N=N—$C_6H_4$—R' or

N=N—$C_6H_4$—R',

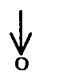

O where R' is a hydrogen atom or a straight, branched or cyclic $C_{1-10}$ alkyl residue, and Y is a hydrogen atom or a side chain of the formula:

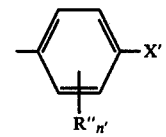

where X', R" and n' have the same definitions as and are respectively identical to or different from X, R and n, the side chain being in position 6 when the compound is substituted in position 2 and in position 7 when it is substituted in position 3.

Compounds of formula (I) have a high order parameter and are very stable.

1 Claim, No Drawings

COMPOSITION BASED ON LIQUID CRYSTAL FOR ELECTRO-OPTICAL DEVICE

The invention relates to liquid-crystal-based compositions for use in electro-optical devices and more particularly in display arrangements.

For a dye to be used appropriately in solution in a liquid crystal or a display arrangement, it must:
(a) be sufficiently soluble in the liquid crystal;
(b) be perfectly stable both chemically (in particular, inert relative to the liquid crystal) and above all photochemically
(c) have sufficient intensity of absorption; and
(d) not contain any ionic or ionisable groups.

Furthermore, such a dye must have a high order parameter "S"—this parameter corresponding to the measure of the power of orientation of the dye by the molecules of the liquid crystal—for a display with a strong contrast to be obtained. Finally, the basic structure of the compounds envisaged must of course correspond to a colour appropriate for use in a display arrangement, preferably blue and red.

The first dyes used in liquid crystals were azoic dyes or derivatives thereof, as disclosed particularly by D. L. White and G. N. Taylor, J. Appl. Phys. 45, 4718 (1974), by A. Bloom et al., Mol. Cryst. Liq. Cryst. Letters 41, 1 (1977) and by J. Constant et al., Elec. Letters, 12, 514 (1976). These compounds generally have a relatively high order parameter. On the other hand, most of them do not have an appropriate maximum absorption wavelength, and in particular azoic dyes are not sufficiently stable to light, so they cannot be considered for use in manufacturing commercial liquid-crystal displays.

Research has therefore been carried out leading to the discovery of colouring agents with better stability relative to light. B.D.H. Chemicals Limited, for example, in published European patent application No. 78300487.2, have disclosed the fact that some classes of anthraquinones have a better combination of the desired properties mentioned above. These classes are more particularly the 1-p-substituted anilino-4-hydroxy-anthraquinones and the 1,5-di(p-substituted anilino)-anthraquinones.

Although the above mentioned anthraquinone compounds brought a substantial improvement over azoic compounds as colouring agents for liquid crystals, investigations have nevertheless continued into similar anthraquinone structures in an attempt to find other classes of compounds capable of giving still better combinations of the properties required for use in liquid-crystal display arrangements.

The invention is based inter alia on the discovery that basic anthraquinone structures, with an $NH_2$ or $OH$ group in position 1, have a higher order parameter when a side chain is substituted on the anthraquinone ring in position 2 or positions 2 and 6, or respectively in position 3 or positions 3 and 7.

The present invention provides a composition based on liquid crystal and designed for use in an electro-optical device, particularly a display arrangement, and containing as pleochroic dye an anthraquinone compound represented by general formula (I)

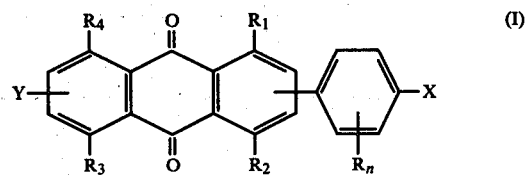

where $R_1$ is a substituted or unsubstituted amino group or a hydroxy group; each of $R_2$, $R_3$ and $R_4$, which are identical or different, is a hydrogen atom, a substituted or unsubstituted amino group, a hydroxy group or a nitro group; R is a hydrogen or halogen atom or a hydroxy, lower alkyl or lower alkoxy group; n is 1, 2, 3 or 4, the Rs being identical or different when n is 2, 3 or 4; X is a hydrogen or halogen atom, a hydroxy or mercapto group, a straight, branched or cyclic $C_{1-16}$ alkyl radical, a substituted or unsubstituted aryl group or a group of formula OR', OAr, SR', SAr, COOR', COOAr, COO—$C_6H_4$—R', OOCR', OOCAr, OOC—$C_6H_4$—R', CONHR', CONHAr, NHR', NHAr, NHCOR', NHCOAr, OCOOR', OCOOAr, CH=N—$C_6H_4$—R', N=CH—$C_6H_4$—R', N=N—$C_6H_4$—R' or N=N—$C_6H_4$—R', 

where R' is a hydrogen atom or a straight, branched or cyclic $C_{1-10}$ alkyl residue, and Y is a hydrogen atom or a side chain of the formula:

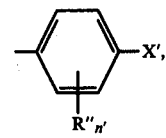

where X', R" and n' have the same definitions as and are respectively identical to or different from X, R and n, the side chain being in position 6 when the compound is substituted in position 2 and in position 7 when it is substituted in position 3.

Such compounds have a good stability to light.

Some examples of basic anthraquinone structures are the structures of formula (II), each corresponding to a basic shade of colour,

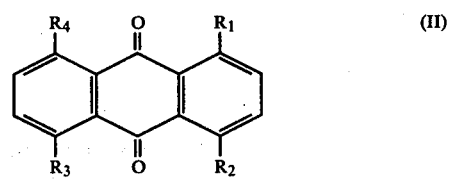

where $R_1$, $R_2$, $R_3$ and $R_4$ are as defined above and combined as set out in Table I below.

TABLE I
Basic anthraquinone structures of formula (II)

Formula (II)

| | $R_1$ | $R_2$ | $R_3$ | $R_4$ | Colour |
|---|---|---|---|---|---|
| A | $NH_2$ | $NH_2$ | H | H | blue |
| B | $NH_2$ | H | $NH_2$ | H | yellow |
| C | $NH_2$ | $NH_2$ | $NH_2$ | $NH_2$ | blue |
| D | $NH_2$ | OH | H | H | red |
| E | $NH_2$ | OH | OH | $NH_2$ | blue |
| F | $NH_2$ | OH | $NH_2$ | OH | blue |
| G | $NH_2$ | $NH_2$ | $NO_2$ | H | blue |
| H | $NH_2$ | H | H | H | yellow |
| I | $NH_2$ | H | H | $NH_2$ | orange |
| J | OH | H | H | H | yellow |
| K | OH | OH | H | H | orange |
| L | OH | H | OH | H | yellow |
| M | OH | H | H | OH | yellow |
| N | OH | $NH_2$ | $NH_2$ | OH | blue |
| O | $NH_2$ | H | $NO_2$ | H | orange |

The introduction of a side chain in the basic formula (II) structures, in position 2 or positions 2 and 6, or respectively in position 3 or positions 3 and 7, leads to the formula (I) compounds and is designed to increase the order parameter of these basic structures, while maintaining the other properties such as chemical stability and stability relative to light, while allowing for the fact that the nature of the side chain influences the shade of colour of the basic structure, the solubility of the structure and the order parameter.

Although a formula (I) dye with a side chain in position 2 (or still better, two side chains), of the alkoxyphenyl type, has a good order parameter in a mixture of liquid crystals based on biphenyl, phenylcyclohexane or pyrimidine, it is not the same with a mixture based on esters. One will then use colouring agents of formula (I) in which the side chain is an ester of benzoic acid. In some compositions it is preferable to use a formula (I) compound with only one side chain rather than two.

Swiss patent (application No. 8863/79 of 10.2.1979) describes a class of very stable anthraquinone compounds where the order parameter is approximately 0.60 to 0.65. They comprise the same basic structure of formula (II) as mentioned above, substituted in position 2 or 3 by a side chain similar to that defined for the composition of formula (I) of the present invention, except that the side chain is joined to the anthraquinone ring through the agency of an oxygen atom. Examination of the molecular model of such a compound shows that the angle of 120° formed by the two bonds of the oxygen bridge does not allow the molecule to take on an ideal elongated shape (see diagram below). This is reflected in the values of the order parameter in the liquid crystal, which are relatively low.

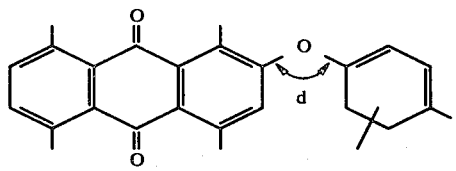

On the other hand, in the formula (I) compounds used in the composition according to the invention, e.g. compound (Ia) below, elimination of the oxygen bridge gives a more rigid, elongated molecule and better conjugation between the lateral substituent and the anthraquinone ring.

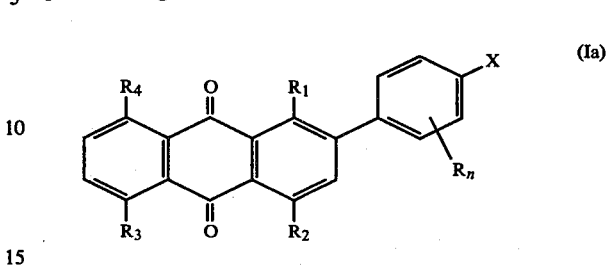

For example, for an identical basic anthraquinone structure of formula (II) and for an identical side chain in position 2, the absence of the oxygen bridge enables the order parameter to be increased from 0.60–0.65 to 0.65–0.70. The stability of the compound without any —O— bridge is not substantially different from that with such an —O— bridge, and yet is perfectly adequate for use in solution in a liquid crystal for a display arrangement; this stability is in any case far greater than that of other types of colouring agents with a comparable order parameter.

As far as the length of the side chain or chains is concerned, this at least partly determines the solubility of the formula (I) compound and should consequently not be more than about 24 carbon atoms. Substituents X and $R_n$, or respectively X' and $R''_{n'}$, of the benzene ring present in the side chain or chains each preferably have a maximum of 10 carbon atoms, but when several of these groups are present simultaneously the total number of carbon atoms should not theoretically exceed about 24. Above this figure there is a probability that compound (I) may not be sufficiently soluble in the liquid crystal and could consequently not be used to colour it.

The invention will now be illustrated with examples in which the properties of some formula (I) compounds have been studied. More particularly, the solubility and order parameter of the compounds mentioned in Table II below have been measured, using the following known methods:

Measurement of solubility (by colorimetry)

A saturated solution of each of compounds 1 to 19 is prepared in a liquid crystal, and the solution obtained is filtered, 100 μl of the filtrate is taken out and dissolved in 50 cc of chloroform.

The optical density of each solution is measured spectroscopically, and the concentration of the dye at saturation is deducted from the reading, the coefficient of absorption being known in chloroform.

The results obtained are set out in Table II. In connection with the values given for solubility, it should be pointed out that the solutions were considered as saturated when the contained grains of colouring agent after being heated in isotropic phase and agitated for 3 minutes.

Determination of order parameter (S)

A 0.5% solution of each of compounds 1 to 19 in a liquid crystal is placed in a glass cell 30μ thick, coated with an aligning film (tangentially evaporated $SiO_x$ or polished polyimide). The optical density of each of the solutions is then measured at its maximum absorption in polarised light, firstly when the direction of the polariser is parallel with ($D_\parallel$) and secondly when it is perpendicular to ($D_\perp$) the direction of alignment. The order parameter is calculated from the following equation:

$$S = \frac{r-1}{r+2}$$

where r is the dichroic ratio corresponding to the ratio $$\frac{D_\parallel}{D_\perp}$$

The results obtained have also been set out in Table II below. It will be seen from Table II that the values of the order parameter (S) varies according to the liquid crystal used for the measurement. In the case of compound No. 14, the order parameter passes from 0.72 measured in "E7" (temperature of nematic-isotropic transition = 59.8° C.) to 0.77 measured in "ROTN 404" (temperature of nematic-isotropic transition = 105° C.).

concerned, this depends essentially on the stability of the dye in light. The lifetime is therefore measured as follows for compounds 1 to 19 in Table II.

A glass cell, similar to that used in determining the order parameter, and containing a solution of each of the above mentioned compounds in a liquid crystal, is subjected to radiation from a "Xenon" lamp, filtered so as to reconstitute solar illumination at mid-day in our latitudes (Leybold Heraeus Sun Test). The thickness of the cell and the concentration of each solution are adjusted to bring the optical density close to 1, and the time taken for the optical density to reach half its initial value is measured. In the case of the formula (I) compounds in Table II, all have a half life of over 1000 hours. This is perfectly adequate in practice for use as liquid crystal dyes intended for display cells, e.g. for watches or measuring instruments.

The formula (I) compounds which can be used as dyes in solution in liquid crystals for display devices may be prepared by conventional methods of synthesising anthraquinone compounds, for example as described by K. Venkataraman et al., Indian Journal of Chemistry, 9, 1060 (1971).

The preparation of two formula (I) compounds will now be described by way of example.

TABLE II

Properties of formula (I) compounds

Compound I (basic structure II-F Side chain(s))

| | X (position) $R_n$ | Y (position) | Melting point (°C.) | Solubility in LC (%) | Optical Properties λ max. (nm) $CHCl_3$ | LC | Order parameter S (LC) |
|---|---|---|---|---|---|---|---|
| 1 | $-C_6H_4-OH$ (2) | H | >300 | 2.5* | 580 / 618 | 595 / 595* / 640 / 640* | 0.64 / 0.65 / 0.69* |
| 2 | $-C_6H_4-OCH_3$ (2) | H | 268-270 | 0.9 | 580 / 618 | 595 / 638 | 0.65 / 0.70* |
| 3 | $-C_6H_4-OC_3H_7$ (2) | H | 225.6-227.5 | 1.2 | 580/618 | 596/640 | 0.67/0.68 |
| 4 | $-C_6H_4-OC_4H_9$ (2) | H | 196-198.5 | 0.4 | 580/620 | 595/637 | 0.64/0.66 |
| 5 | $-C_6H_4-OC_5H_{11}$ (2) | H | 171-176 | 4.5 | 580/618 | 596/638 | 0.64/0.65 |
| 6 | $-C_6H_4-OC_7H_{15}$ (2) | H | 150-155 | 6.0 | 580/618 | 598/643 | 0.65/0.66 |
| 7 | $-C_6H_4-OC_8H_{17}$ (2) | H | 175-181 | 1.4 | 580/618 | 597/642 | 0.66/0.67 |
| 8 | $-C_6H_4-OOCC_5H_{11}$ (2) | H | 181-188 | 3.8 | 580/616 | 595/640 | 0.64/0.65 |
| 9 | $-C_6H_4-OOCC_6H_{13}$ (2) | H | 175.9-180.5 | 3.5 | 582/638 | 594/638 | 0.64/0.66 |
| 10 | $-C_6H_4-OOCC_6H_4C_4H_9$ (2) | H | 199-203 | 4.2 | 580/618 | 595/640 | 0.65/0.66 |
| 11 | $-C_6H_4OOCC_6H_4OC_5H_{11}$ (2) | H | 211-215 | 4.9 | 595/616 | 595/638 | 0.64/0.66 |
| 12 | $-C_6H_4OOCC_6H_4C_8H_{17}$ (2) | H | 170-188 | 4.5 | 580/618 | 595/640 | 0.64/0.65 |
| 13 | $-C_6H_4OC_3H_7$ (3) | $-C_6H_4-OC_3H_7$ (7) | 166-173 | 7.0 | 580/618 | 596/640 | 0.68/0.70 |
| 14 | $-C_6H_4OC_4H_9$ (3) | $-C_6H_4-OC_4H_9$ (7) | 209-215 | 7.0 / 3.5* | 580/616 | 598/640 / 598*/640* | 0.71/0.72 / 0.77* |
| 15 | $-C_6H_4-OC_5H_{11}$ (3) | $-C_6H_4-OC_5H_{11}$ (7) | 210-217 | 7.2 | 580/617 | 598/641 | 0.73/0.74 |
| 16 | $-C_6H_4-OC_8H_{17}$ (3) | $-C_6H_4-OC_8H_{17}$ (7) | 206 | 7.5 | 579/616 | 598/640 | 0.73/0.75 |
| 17 | $-C_6H_4-OC_6H_{13}$ (2) | H | 180-184 | 4.7 | 582/640 | 595/640 | 0.65/0.65 |
| 18 | $-C_6H_4-OH$ (3) | H | >300 | | | 590/634 | 0.67/0.67 |
| 19 | $-C_6H_4-OCH_3$ (3) | H | 180-189 | 5.7 | 580/614 | 598/634 | 0.68/0.69 |

N.B The liquid crystal (LC) in which the solubility and order parameter are measured in "E7" produced by BDH Chemicals Limited, except for the values marked with an asterisk (*), where the measurements are taken in "ROTN 404" produced by Hoffman-La-Roche AG.

As far as the lifetime of the formula (I) anthraquinone dye and hence of the composition of the invention is

Preparation of 4,8-diamino-1,5-dihydroxy-3-p-butoxyphenyl-anthraquinone (Compound 4)

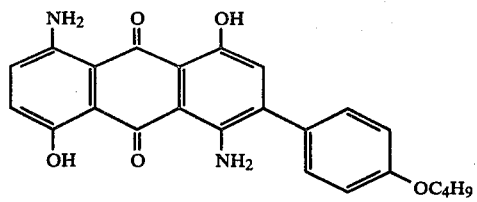

4.0 g of sodium 4,8-diamino-1,5-dihydroxy-anthraquinone-2,6-disulfonate is dissolved in a mixture of 2.0 g of boric acid and 30 ml concentrated sulphuric acid heated to 80° C. The blue solution obtained is cooled to a temperature of 0° to 5° C., and 2.8 g of butoxybenzene is stirred in drop by drop, the colour then changing from blue to reddish brown. The mixture is agitated for a further two hours at 0° to 10° C., then poured onto ice. The suspension obtained is heated on reflux for 4 hours to destroy the boric ester, and a violet precipitate is filtered off after cooling, corresponding to 4,8-diamino-1,5-dihydroxy-3-p-butoxyphenyl-anthraquinone-6-sulphonic acid. The moist precipitate is dissolved hot in a mixture of 24 ml of 33% ammonia and 160 ml of water, and the sulphonic groups are separated by adding 2.2 g of sodium dithionate in stages. The mixture is finally heated to 95° C. for approximately 2 hours, then cooled and filtered. The precipitate thus obtained is washed with slightly acidified water, then with a great excess of water, and dried. The desired product may further be purified by crystallisation or chromatography if necessary.

Preparation of 4,8-diamino-1,5-dihydroxy-2,6-di(p-butoxyphenyl)-anthraquinone (Compound 14)

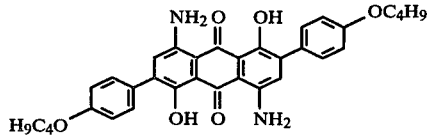

8.25 g of 1,5-dihydroxy-4,8-dinitroanthraquinone is dissolved in a mixture of 13 g of boric acid and 190 ml of concentrated sulphuric acid. The solution obtained is cooled to from −10° to 0° C. 8.50 g of butoxybenzene is added drop by drop and the mixture is kept at the above mentioned temperature for about 1 hour. The reaction mixture is poured onto 200 g of crushed ice, and the resultant suspension is heated at reflux for 4 hours to destroy the boric ester. It is then filtered, washed with water until neutral, and dried. 10 g of the crude product thus obtained is then reduced by heating it to boiling point for 2 hours in a solution containing 50.0 g of sodium sulphide, 250 ml of water and 32 ml of ethanol. The mixture is filtered hot and the precipitate recovered is washed with water until neutral. The moist precipitate is further heated to boiling point with 300 ml of 10% hydrochloric acid, filtered, washed until neutral, and dried. The desired product (compound No. 14) may further be purified by crystallisation or chromatography if necessary.

In the composition according to the invention a single type of liquid crystal may be used, or preferably a mixture of liquid crystals such as those marketed e.g. by BDH Chemicals Limited under references E3, E7, E8 or E9 (the respective compositions being mentioned in published European patent application No. 78300487.2) or by Hoffmann-La-Roche under references ROTN-103 or ROTN 404. The liquid crystals should preferably be neumatic with positive or negative anisotropy, and may or may not contain an optically active agent in addition.

The composition according to the invention may further comprise two or more formula (I) dyes or possibly other types of anthraquinone dyes, as well as a cholesterising agent and/or an aligning agent. The cholesterising agent may be the one known from BDH Chemicals Limited under reference "CB 15", which is preferably added in a quantity of about 3% of the total composition. The aligning agent designed to disperse the molecules of the liquid crystals perpendicularly to walls of the electro-optical device may be approximately 2% of a surfactant, for example a sorbitol monoester, sorbitol monolaurate being particularly suitable.

Finally, the pleochroic dye of formula (I) is generally present in the composition of the invention in a quantity corresponding to about 0.5 to 5% of the total composition, e.g. preferably about 1.5%.

Some of the commercially available entectic mixtures which are usable as liquid crystals for the realization of a digital display cell, especially for a watch, are mentioned in the following Table III. The commercial mixtures of which the reference letter is "E" are provided by B.D.H. Chemicals Ltd. (GB), "TN" by Hoffmann La-Roche (CH) and "ZLI" by Merck Co. (Darmstadt, West Germany).

TABLE III

Examples of liquid crystals mixtures

| Commercial name | Basic composition of liquid crystals | $T_{NI}$ (°C.) | $\Delta\epsilon$ |
| --- | --- | --- | --- |
| E8 | cyano-biphenyls | 70.5 | +13 |
| E43 | cyano-biphenyls | 84 | ~ +10 |
| TN 103 | cyano-esters | 81.4 | +25.6 |
| TN 403 | cyano-pyrimidines | 82.1 | +19.18 |
| TN 404 | cyano-pyrimidines | 105 | +21.36 |
| TN 430 | cyano-pyrimidines | 69.2 | +17.60 |
| ZLI 1132 | phenyl-cyanohexane | 70 | +10.3 |
| ZLI 1221 | phenyl-cyanohexane + esters | 90 | +8.0 |
| ZLI 1344 | PCH + esters | 90 | +10.8 |

$T_{NI}$: temperature of nematic-isotropic transition
$\Delta\epsilon$: dielectric anisotropy Some examples of compositions according to the invention are mentioned in the following Table IV, which allow the realization for example of a watch digital display working at 4.5 V and with a thickness of 8 μm.

The appropriate dye concentration is determined depending on the aimed appearance and taking accoung of the cell thickness, whereas the cholesterising agent concentration "CB15" is such that the pitch of the induced cholesteric helix corresponds to the used thickness.

TABLE IV

Examples of compositions according to the invention

| Liquid crystals mixtures (commercial name) | $T_{NI}$ (°C.) (compos.) | Dye (I) No | % | % "CB15" |
|---|---|---|---|---|
| E8 | 71.4 | 14 | 0.34 | 4.46 |
| E43 | 86.2 | 14 | 3.42 | 4.06 |
| TN 103 | 88.5 | 14 | 0.50 | 4.80 |
| TN 404 | 106.6 | 14 | 0.60 | 4.98 |
| ZLI 1132 | 73.7 | 14 | 0.03 | 3.31 |
| E37 | 94.1 | 4 | 0.16 | 4.20 |
| TN 430 | 72.8 | 4 | 1.58 | 5.27 |
| TN 403 | 84.2 | 4 | 0.90 | 4.83 |
| TN 921 | 103.9 | 4 | 0.078* | 3.54 |
| ZLI 1221 | 92.8 | 4 | 1.56 | 2.94 |
| ZLI 1344 | 92.2 | 4 | 0.080* | 3.26 |

(*saturation)

What we claim is:

1. A composition based on liquid crystal and designed for use in an electro-optical device, that contains as pleochroic dye an anthraquinone compound selected from the group consisting of 4,8-diamino-1,5-dihydroxy-2,6-di(p-butoxy-phenyl)-anthraquinone and 4,8-diamino-1,5-dihydroxy-3-p-butoxyphenyl-anthraquinone.

* * * * *